June 23, 1953  A. L. A. MORGEN  2,642,846
HYDRAULICALLY OPERATED DEVICE FOR CONTROLLING THE
POSITION OF IMPLEMENTS CARRIED BY TRACTORS
Filed Aug. 8, 1950
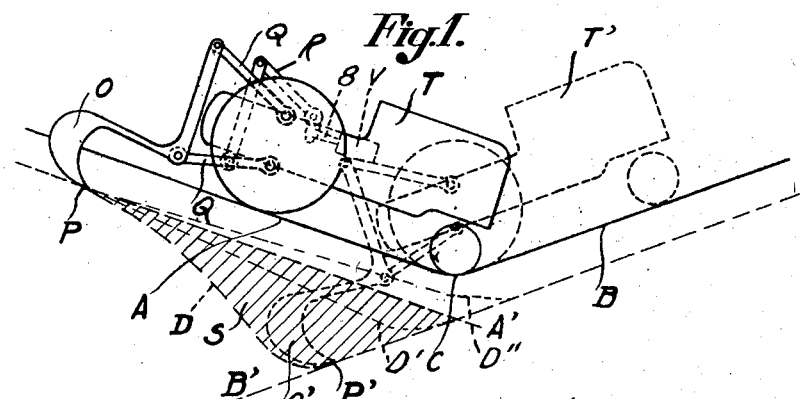
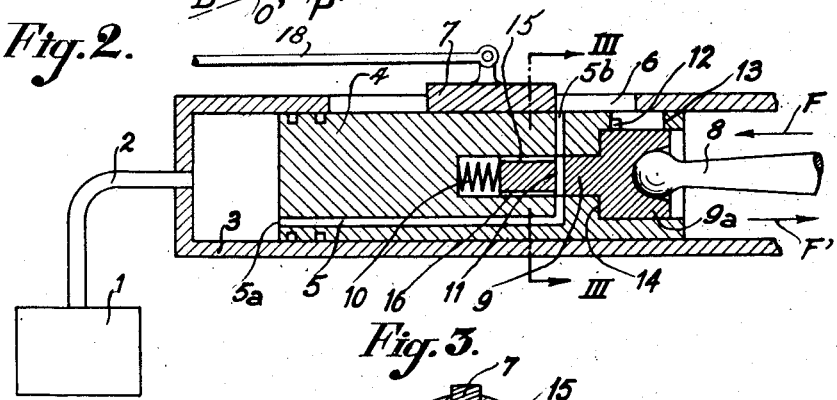
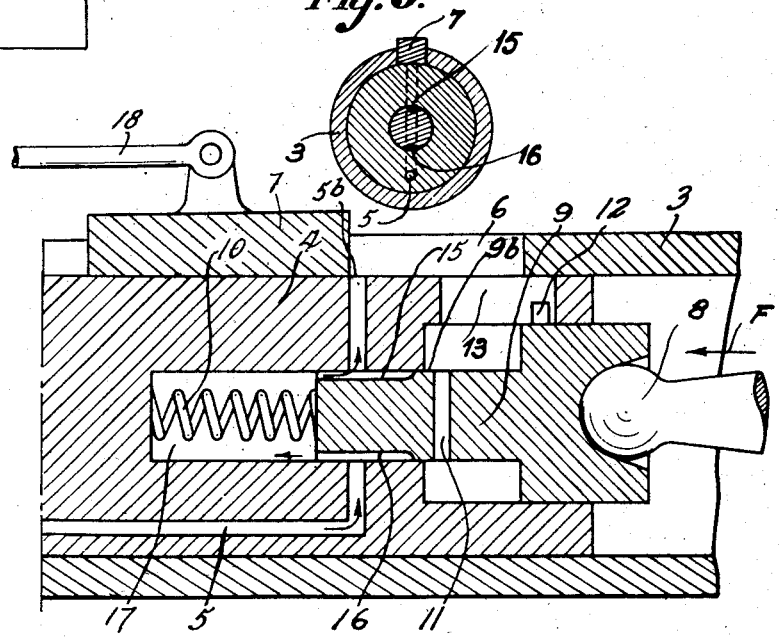
André L. A. Morgen
By Fraser, Myers & Manley
Attys.

Patented June 23, 1953

2,642,846

UNITED STATES PATENT OFFICE 2,642,846

HYDRAULICALLY OPERATED DEVICE FOR CONTROLLING THE POSITION OF IMPLEMENTS CARRIED BY TRACTORS

André L. A. Morgen, Reims, France

Application August 8, 1950, Serial No. 178,194
In France September 14, 1949

3 Claims. (Cl. 121—41)

In my prior U. S. A. copending patent applications Ser. No. 75,233 filed February 8, 1949, and Ser. No. 156,514 filed April 18, 1950, I have described hydraulically operated devices for the adjustment of the working depth of tools or implements carried by a tractor and for lifting said implements when they are not in operation. These devices essentially comprise a hydraulic jack whose cylinder is carried by a tractor, whereas the piston is connected to the implement, a source of liquid under pressure continually delivering into said jack cylinder, and means for displacing a discharge outlet for said liquid along said cylinder. In operation, the jack piston assumes a position within its cylinder which depends on the position of the discharge outlet, in such a way that said outlet is just barely uncovered.

In practice, these devices show serious drawbacks when the ground to be worked is not uniformly planed.

When the tractor crosses a depression in the ground or when it passes over a bulge or ridge, there is produced a distortion of the tractor-implement connection which amounts to a raising of the implement relatively to the tractor. Generally speaking, when the nose or front part of the tractor rises as the front wheels move past the bottom of a depression or start climbing the slope of a bulge or ridge, and since the implement remains substantially unaffected by this vertical angular displacement of the tractor, the position of the implement relatively to the tractor varies or tends to vary in the direction corresponding to a raising of the implement. In other words, a rise of the nose of the tractor while the implement is stationary is equivalent to a rise of the implement, the tractor being stationary. The result of this relative raising of the implement is that the latter is free to move down or dig in towards its prior relative position for which it has been adjusted. Actually it does so because of its own weight and of the reaction of the ground. As a consequence, the soil is dug deeper in the vicinity of the bottom of a depression or of the foot of a bulge; in other words, the unevenness of the ground tends to increase.

This invention aims at avoiding such a drawback.

An object of the invention is to provide for a hydraulically-operated device of the type described in the above-mentioned applications, which device will prevent the implement from digging in when the nose of the tractor rises. This device includes for that purpose, means for transmitting the thrust from the jack-piston to the connecting rod upon which said piston acts through the medium of a sliding member adapted to follow up the relative movements of said connecting rod with respect to the piston, said sliding member, during its displacement, obturating the liquid-discharge duct. As a consequence of the obturation of the discharge duct, the piston is displaced by the liquid pressure, so that it follows up the movement of the connecting rod, continuing to exert its thrust upon said rod and thus preventing the tools from digging in to an undue depth into the ground.

Other objects and advantages of the invention will be apparent during the course of the following description. In the accompanying drawing like numerals are employed to designate like parts throughout the same.

Fig. 1 is a diagrammatic and theoretical section of the ground on which the tractor operates, the tractor and carried implement being shown in outline, Fig. 2 is a longitudinal section of an improved hydraulic device according to this invention, Fig. 3 is a section taken along line III—III of Fig. 2, and Fig. 4 is an enlarged fragmentary view showing the sliding member in its operative position.

As shown in Fig. 1, the theoretical section of the ground is assumed to comprise two sloping planar surfaces A and B, having opposite inclines and intersecting along the line C which forms the bottom of the depression. A tractor T operates on this portion of ground; it supports and draws an implement O through a conventional quadrilateral linkage system. This implement, which normally tends to move down under its weight, is held in position by a lifting transmission R which abuts, through a rod 8, against the piston of a hydraulic jack V. In this jack, which is continuously fed with liquid under pressure, the piston is immobilized owing to the fact that the jack comprises, as will be shown hereafter with reference to Fig. 2, a discharge outlet of variable position. When the piston uncovers this outlet, pressure in the jack drops and the piston can no longer be urged beyond this outlet. It cannot either move back since such a displacement would cause the discharge outlet to be obturated and the pressure to build up in the jack, thus returning the piston to its initial position. Consequently, when the tractor moves over flat land such as A, the implement O is held at constant depth and its end P remains in the plane A'. Similarly, if the tractor moves over any plane B, the end of the implement remains in the plane B'.

However, when the tractor T has moved beyond the position shown in full lines in the figure, in its rightward motion, its front part is raised; relatively to the tractor this is equivalent to a raising of the tool O, by distortion of the quadrilateral linkage Q.

At that moment, the rod 8 stops pressing against the piston and no longer prevents the tool O from digging in to an increased depth. The operating depth of the tip P therefore increases, and this tip moves along the path indicated by the dotted line D, as the tractor gradually advances, until finally, the tractor having reached the position T' (in dotted lines) the tool located at O' is restored to its initial relative position with respect to the tractor. Indeed, at this moment, the tip of the implement reaches the point F' in the plane B' parallel to the plane B and at the same depth below the latter as the plane A' is relatively to the plane A. The relative position of the tractor and of the implement is thus reestablished but, it will accordingly be found that the ground adjacent the depression has been ploughed through the hatched area S.

This theoretical example in which it was assumed that the tractor moved very slowly shows that hydraulic devices constructed in the manner described in the prior patents, when operating over a depression, increases the working depth of the tool, which is particularly objectionable as the weakening of the soil thus produced by the implement tends to facilitate its being carried away by running water, thereby still further increasing the depth of any depressions that may exist on the ground.

To overcome these drawbacks, the present invention provides a hydraulically operated device as illustrated for example in Fig. 2.

It should be recalled that a hydraulic device of the type contemplated herein comprises a source 1 of liquid under pressure which permanently delivers liquid through a duct 2 into a jack comprising a cylinder 3 and a piston 4. The piston 4 is provided with a duct 5 opening at one end 5a onto the inner space of the cylinder and at its other end 5b onto the side surface of the piston. The outlet orifice 5b is arranged in register with a slot 6 in the cylinder wall, along which a valve member 7 is adapted to slide. This valve can be displaced by means of a rod 18 connected to a control member.

As known, by displacing this sliding valve 7, a definite position is imparted to the piston 4 relatively to the jack cylinder, more specifically a position such that the orifice 5b is just barely uncovered. The piston 4 exerts its thrust upon a connecting rod 8 which acts through the transmission linkage R in such a different direction as to raise the tool O carried by the tractor. Thus, when the valve 7 is moved towards the right in Fig. 2, the tool O is raised, whereas, when the tool is stationary, the piston 4 forms an abutment preventing the tool O from moving down.

According to the present invention, the link between the piston 4 and the connecting rod 8 is effected through the agency of a sliding member, herein shown as a small piston 9 having an enlarged head portion 9a in which is formed a knee socket engaged by the ball-shaped end of the connecting rod 8. This small piston 9 is subjected to the action of a compression spring 10 which tends to urge it out of the bore of the main piston 4 in which the small piston 9 is mounted.

The latter is provided with a transverse bore 11 so that in the position illustrated in Fig. 2 it does not break the continuity of flow through the duct 5. Means of any suitable description are provided to prevent the small piston from rotating about its axis and also from escaping out of the bore formed therefor in the larger piston. In the embodiment shown, these conditions are met owing to a member 12 screwed into and projecting from the enlarged head of the small piston 9 and sliding in a slot 13 of the main piston.

When the tractor moves over flat land, the connecting rod 8 exerts, owing to the weight of the tool, a permanent thrust in the direction of arrow F upon the main piston 4 through the agency of the smaller piston 9, so that the enlarged head 9a of the latter is retained in abutment against the shoulder 14 of the housing of the small piston 9. In this position the duct 5 is uninterrupted and the device will therefore operate exactly as described in my afore-defined prior applications viz., the two pistons form an abutment for rod 8 and the working depth of the tool is kept constant.

When the front wheels of the tractor move past the bottom of a depression or start climbing the side of a bulge, the quadrilateral linkage is distorted in the direction corresponding to a raising of the implement, as explained above. More particularly, the link R rotates clockwise (see Fig. 1) and the rod 8 is therefore urged towards the left in Fig. 1 or towards the right in Fig. 2, i. e., in the direction of the arrow F'.

Because of this displacement of the rod 8 in the direction of the arrow F':

(a) The small piston 9 which is urged by the spring 10 moves towards the right and seals the duct 5;

(b) The liquid discharged by the pump 1 into the cylinder 3 can no longer flow through the duct 5 and pressure builds up at the rear of the main piston 4 which, as a result, moves towards the right.

Thus the means 9—4 have "followed up" the rod 8, so that the latter is still in abutting relation and is not free to move back in the direction of the arrow F unless the pressure of the liquid is overcome, in which case the return motion will be strongly braked.

The consequence of this follow-up movement is that the implement will not dig in since this would correspond to a leftward displacement of the rod 8, i. e., in the direction of the arrow F, which displacement is considerably braked.

If the duct 5 were not obturated, as in my earlier devices, the piston 4 would remain stationary and the return movement of the rod in the direction F would not be braked. The tip of the tool would then move along the curve D; on the contrary, the duct 5 being obturated, the rod 8 remains in contact with the piston 9 and the piston 4 moves towards the right owing to the liquid pressure. In order to return to normal equilibrium position, the thrust exerted by the rod, due to the weight of the tool must first push back the small piston 9 into its housing, then both pistons together until the initial position is reached. The tool is therefore no longer free to dig in, its downward motion being braked, and as a result its tip describes the curve D' if the tractor moves slowly, or even a curve such as D'' if the tractor moves relatively fast. It is thus possible to avoid in the hollows, increase in depth of work.

To enhance the efficiency of operation of the device i. e., the braking of the downward motion of the tool after casual rise, a pair of small diametrically opposite grooves 15 and 16 are provided in the end portion of the small piston 9 to serve as shown in Fig. 4, as by-pass means for the oil flowing through the duct 5 which can no longer pass because of the displacement of the piston 9, through the bore 11. Thus the space 17 provided behind the small piston in order to house the spring 10, gets filled with oil.

As the tool tends to sink to an excessive depth on crossing a depression, or in other words as it tends to exert a thrust in the direction shown by arrow F (see Fig. 4), both the main and the small pistons oppose this thrust, the former because of the presence of oil contained in the cavity 17 and of the spring 10, and the latter because of the pressure of liquid supplied from the source 1, since duct 5 is sealed.

In order to increase the resistance of the small piston 9 to the thrust exerted by the rod 8, the grooves 15 and 16 may, as shown in Fig. 4, be restricted in extent to that part of this small piston engaged towards the bottom of the cavity 17, or in other words, to retain on the piston, between the bore 11 and the starting point of the grooves 15 and 16, a cylindrical portion 9b deprived of grooves. Thus, the oil enclosed in the cavity 17 can only escape, towards the end of the return stroke of the small piston, through the very small leakage clearance provided between the latter and its housing, thereby further retarding this return motion. To further increase the resistance to digging of the small piston, the upper groove 15 may be completely done away with and the lower groove 16 be widened.

In order to reduce the sensitiveness of the device, the bore 11 may be increased or ovalized, so that small displacements of the piston 9 will not disturb the discharge flow of oil through the duct 5.

It is to be understood that the form of the invention herewith shown and described is to be taken as a preferred example of the same and that various changes in the shape, size and arrangement of parts may be resorted to without departing from the spirit of the invention or the scope of the subjoined claims.

What I claim is:

1. A hydraulically-operated device for controlling the position of an agricultural implement carried by a tractor, of the type including a cylinder on said tractor closed at one end and provided with an intake opening at said end and an exhaust opening spaced therefrom, a piston in said cylinder provided with a passage for connecting up said intake and exhaust openings, valve means displaceable longitudinally of the cylinder for controlling said exhaust opening, and a source of liquid under pressure continuously discharging through said intake opening, said device comprising a slidable member fitted into an axial recess of said piston across said passage, and provided with a duct adapted to register in one relative position of the piston and the slidable member with said passage, abutting means for said slidable member in said piston when in said relative position, a linkage between said slidable member and said implement, adapted to urge said slidable member inwardly of said piston when the implement tends to move downwards, and resilient means for urging said slidable member outwardly of said piston.

2. A hydraulically-operated device as claimed in claim 1, in which the resilient means is constituted by a spring located in the recess of the piston and extending between the bottom of said recess and said slidable member.

3. A hydraulically-operated device as claimed in claim 1, in which grooves are provided on the lateral surface of the slidable member, said grooves extending from adjacent the duct to the end of said member facing the bottom of the recess, whereby a liquid passage is provided between said recess and the passage through the piston.

ANDRÉ L. A. MORGEN.

References Cited in the file of this patent

UNITED STATES PATENTS

| Number | Name | Date |
|--------|------|------|
| 1,747,468 | Cowardin | Feb. 18, 1930 |
| 1,822,667 | Proell | Sept. 8, 1931 |
| 1,846,089 | Davis | Feb. 23, 1932 |
| 1,960,996 | Guernsey | May 29, 1934 |